United States Patent
Lopez

(10) Patent No.: US 11,112,227 B1
(45) Date of Patent: Sep. 7, 2021

(54) TAPE MEASURE ATTACHMENT SYSTEM

(71) Applicant: Gustavo Lopez, San Antonio, TX (US)

(72) Inventor: Gustavo Lopez, San Antonio, TX (US)

( * ) Notice: Subject to any disclaimer, the term of this patent is extended or adjusted under 35 U.S.C. 154(b) by 80 days.

(21) Appl. No.: 16/601,999

(22) Filed: Oct. 15, 2019

(51) Int. Cl.
*G01B 3/1071* (2020.01)
*G01B 3/1084* (2020.01)

(52) U.S. Cl.
CPC ......... *G01B 3/1071* (2013.01); *G01B 3/1084* (2013.01); *G01B 2003/1079* (2013.01)

(58) Field of Classification Search
CPC ............... G01B 3/1071; G01B 3/1084; G01B 2003/1079; G01B 3/1089
USPC ........................................ 33/770, 42, 668
See application file for complete search history.

(56) References Cited

U.S. PATENT DOCUMENTS

| | | | | |
|---|---|---|---|---|
| 2,256,676 A * | 9/1941 | Iverson | ................ | G01B 3/1071 33/486 |
| 2,591,333 A * | 4/1952 | Bellmer | ............... | G01B 3/1061 33/770 |
| 2,681,507 A * | 6/1954 | Underwood | ............. | B25H 7/04 33/27.03 |
| 3,289,305 A * | 12/1966 | Norton | .................. | G01B 3/1084 33/759 |
| 3,744,134 A * | 7/1973 | Zima, Jr. | .............. | G01B 3/1071 33/768 |
| 5,189,801 A * | 3/1993 | Nicely | ................. | G01B 3/1071 33/42 |
| 5,295,308 A * | 3/1994 | Stevens | ................ | G01B 3/1084 33/770 |
| 5,458,946 A * | 10/1995 | White, Jr. | ............ | G01B 3/1071 220/229 |
| 5,481,813 A * | 1/1996 | Templeton | ........... | G01B 3/1071 33/758 |
| 5,542,184 A * | 8/1996 | Beard | .................. | G01B 3/1071 30/293 |
| 6,094,833 A * | 8/2000 | Medley, Jr. | .............. | G01C 9/28 33/770 |
| 7,490,415 B1 * | 2/2009 | Cubbedge | ............ | G01B 3/1071 33/770 |
| 8,522,447 B1 * | 9/2013 | Novotny | .............. | G01C 15/105 33/770 |
| 9,335,142 B2 * | 5/2016 | DeMartinis | .......... | G01B 3/1084 |

(Continued)

FOREIGN PATENT DOCUMENTS

KR 100820351 B1 * 4/2008 ............. G01B 3/563

*Primary Examiner* — Christopher W Fulton
(74) *Attorney, Agent, or Firm* — Sanchelima & Associates PA; Christian Sanchelima; Jesus Sanchelima

(57) ABSTRACT

A tape measure attachment system including a finger guard assembly for protecting a user from injury is disclosed. When taking measurements on surfaces it is possible to become injured because of a splinter or cut from the surface. The tape measure attachment system prevents such injuries to occur. The tape measure attachment system is mounted to a tape measure blade through a measuring blade slot created by an attachment left side and an attachment right side. These two sides make it possible to take accurate measurements without having to touch the working surface that may possibly cause injury. There is also an overhang that extends towards a user in order to allow the user to glide the tape measure blade along the working surface without having to touch that surface. The tape measure attachment system also includes a pivot point that allows measurements to be taken about a fixed point.

10 Claims, 3 Drawing Sheets

(56) References Cited

U.S. PATENT DOCUMENTS

| | | | | |
|---|---|---|---|---|
| 2004/0060188 A1* | 4/2004 | Cubbedge | ............ | G01B 3/1071 33/770 |
| 2007/0220760 A1* | 9/2007 | Price | ........................ | B43L 7/12 33/42 |
| 2008/0098610 A1* | 5/2008 | Lipps | ................... | G01B 3/1084 33/770 |
| 2012/0073155 A1* | 3/2012 | Mabey | ................. | G01B 3/1005 33/770 |
| 2012/0073156 A1* | 3/2012 | DeLaRosa | ............ | G01B 3/1056 33/770 |
| 2015/0113821 A1* | 4/2015 | Fulton | ................. | G01B 3/1084 33/767 |
| 2017/0261301 A1* | 9/2017 | DeMartinis | .......... | G01B 3/1084 |
| 2017/0322007 A1* | 11/2017 | Stewart | ................ | G01B 3/1084 |

\* cited by examiner

TAPE MEASURE ATTACHMENT SYSTEM

BACKGROUND OF THE INVENTION

1. Field of the Invention

The present invention relates to a tape measure attachment system and, more particularly, to a tape measure attachment system that increases the safety of a user by protecting a user's fingers from splinters or cuts while users operate a tape measure.

2. Description of the Related Art

Several designs for tape measure attachments have been designed in the past. None of them, however, include a cylindrical device having a central slit for removably accepting a tape measure having an overhang on the bottom for the user's index fingers, and a depression on the top for a user's thumb. Tape measures are essential to use in order to be accurate when taking measurements, especially in fields that require precise construction and manufacturing. There are many times when users will get cuts or splinters on their fingers as they glide the tape measure and tape measure blade along surfaces of various materials. Working on surfaces such as wood may easily lead to splinters in the fingers of the users. While working on surfaces such as glass may lead to cuts on the fingers of the users. These situations arise constantly as workers need to work with such materials. Being that the material is used on nearly a daily basis, the users may at times get careless and injure themselves while taking measurements. Hence there is a need for a device that can easily be attached to a tape measure and a tape measure blade that increases the safety of a user while taking measurements and working with possibly dangerous materials.

Applicant believes that a related reference corresponds to U.S. patent No. 20040060188 issued to Phil Eugene Cubbedge for an Extendible Tape Measure Finger Guard and Marking Assist. The Cubbedge reference is an attachment for a retractable tape measure which functions as a finger guard and a measurement index fixed or removably attached to the tape measure storage case or measurement case. However, it differs from the present invention because the Cubbedge reference is cumbersome and mounted only underneath the tape measure. Further, the Cubbedge reference is difficult to use while making measurements. The present invention is mounted to the front of the tape measure as to protect the fingers of a user as they are taking measurements or tracing upon a surface. The present invention allows a user to avoid splinters being inserted into their fingers from the surface on which they are working on. The present invention can also be retrofitted onto the measuring blades of various tape measures with no concerns about the shape and size of the blades. Additionally, the present invention can be kept mount onto tape both when in use and in storage.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a tape measure attachment that protects a user's fingers from splinters or cuts as the user drags the measuring blade along the edge of a piece of work material.

It is another object of this invention to provide a tape measure attachment that can be retrofitted on existing tape measure measuring blades of different tape measures.

It is another object of the present invention to provide a tape measure attachment that can pivot in order to facilitate tracing and marking of surfaces.

It is still another object of the present invention to provide a tape measure attachment that is easily and quickly mounted and unmounted to a tape measure its measuring blade.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
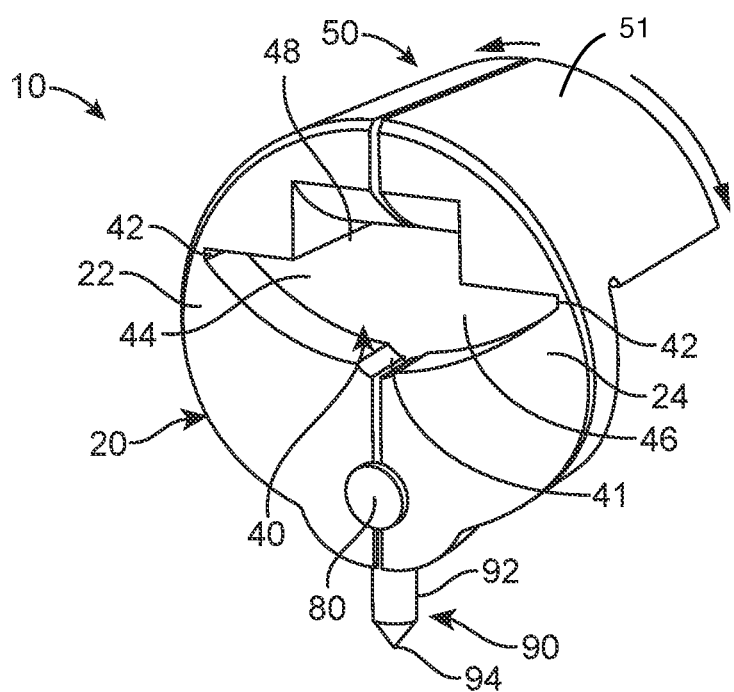
FIG. 1 represents an isometric view of the present invention.

Referring now to the drawings, where the present invention is generally referred to with numeral 10, it can be observed that it, a tape measure attachment system 10 basically includes a finger guard assembly 20, a central slit assembly 40, an overhang assembly 50, a pivot assembly 90 and a tape measure assembly 100.

Referring to FIG. 1 through FIG. 5 the present invention can be seen. It can also be seen that tape measure attachment system 10 can be used with tape measure assembly 100 having a tape measure 102 and measuring blade 110. Tape measure attachment system 10 can be retrofitted onto tape measure 102, more specifically, the present invention can be retrofitted onto the existing measuring blade 110 of tape measures. In an alternate embodiment, tape measure attachment system 10 may be fixedly mounted onto measuring blade 110 of tape measure 102. Preferably the present invention can be removably mounted to tape measure 102. Tape measure attachment system 10 may be made of plastic, aluminum, or the like. Any material that will have minimal friction when pressed against or slid against a surface, such as wood, metal or glass, may be suitable.

Tape measure attachment system 10 includes finger guard assembly 20. Finger guard assembly 20 may be pressed up against the surface of working material such as wood, glass or metal for example. The user can then press their hand or finger behind finger guard assembly 20 which results in no need for the user to make contact with the surface they are working with. Thereby resulting in a minimal chance that a user can become injured from a cut or splinter from the working material as the amount of contact made with the working material is reduced. Finger guard assembly 20 further comprises an attachment left side 22 and an attachment right side 24. Finger guard assembly 20 may be substantially circular or oval in shape, but it should be understood that other shapes may be suitable for the present invention. Attachment left side 22 and attachment right side 24 each make one half of finger guard assembly 20. As such, each of attachment left side 22 and attachment right side 24 are substantially semicircular shaped. Attachment left side 22 and attachment right side 24 are adjacently attached by holding member 80. Holding member 80 is circular shaped in the immediate embodiment of the present invention, but any other shape may be suitable. Holding member 80 extends all the way therethrough finger guard assembly 20. In one embodiment of tape measure attachment system 10 holding member 80 may be flush with finger guard assembly 20. In an alternate embodiment holding member 80 may protrude or extend slightly outwardly from finger guard assembly 20. In such alternate embodiment, holding member 80 may protrude on only one side or it may protrude on both sides of finger guard assembly 20. Preferably, holding member 80 may be located on a lower half of finger guard assembly 20.

In order for tape measure attachment system 10 to be able to be fitted around a blade of a tape measure an opening may be necessary. Hence, tape measure attachment system 10 further includes central slit assembly 40 having blade central slit 41. Blade central slit 41 may preferably be located on an upper half of finger guard assembly 20. Blade central slit 41 substantially extends to the peripheral sides of finger guard assembly 20. The width of blade central slit 41 may be greater than the height of blade central slit 41. The shape of blade central slit 41 may be a shape that corporates with the shape of a measuring blade 102. Blade central slit 41 has a bottom side 42. Blade central slit 41 curves upwardly starting from bottom side 42 and continues to curve upwardly on both sides, meaning a left side and a right side, as the peripheral sides are reached. It can be appreciated that the shape of blade central slit 41 may be preferably parabola shaped but other shapes that corporate with the shape of tape measure measuring blades may be suitable. Being that blade central slit 41 is found on finger guard assembly 20 and finger guard assembly includes attachment left side 22 and attachment right side 24 it should be recognized that blade central slit 41 is also made of a left and right side. More specifically, attachment left side 22 includes an attachment left side opening 44 and attachment right side 24 includes an attachment right side opening 46. Each of attachment left side opening 44 and attachment right side opening 46 make up a half of blade central slit 41. Each of attachment left side opening 44 and attachment right side opening 46 curves upwardly or curve exponentially until a top side 43 of blade central slit 41 is reached. Top side 43 is located adjacent to the peripheral sides of finger guard assembly 20 and top side 43 extends partially inwards to each of the respective attachment left side 22 and attachment right side 24. When attachment left side opening 44 and attachment right side opening 46 are brought together blade central slit 41 is created. The size and shape of blade central slit 41, attachment left side opening 44 and attachment right side opening 46 are not limited to being what is depicted. It should be understood that any shape or size may be suitable for those aforementioned components. It can be seen that mounted above blade central slit 41 may be a square slot 48. Square slot 48 may be used to accommodate certain tape measures which have upwardly protruding components extending from their respective tape measure blades. Thereby resulting in the tape measure attachment system 10 being able to receive and be retrofitted onto tape measure and tape measuring blades of a variety of shapes and sizes, even those having components protruding upwardly or downwardly from a distal end of measuring blade 110. Preferably, when measuring blade 110 is fitted therethrough blade central slit 41, bottom side 42 of blade central slit 41 is entirely mounted below and against measuring blade 110. While top side 43 of blade central slit 41 is entirely mounted above and against measuring blade 110.

Figure 2:
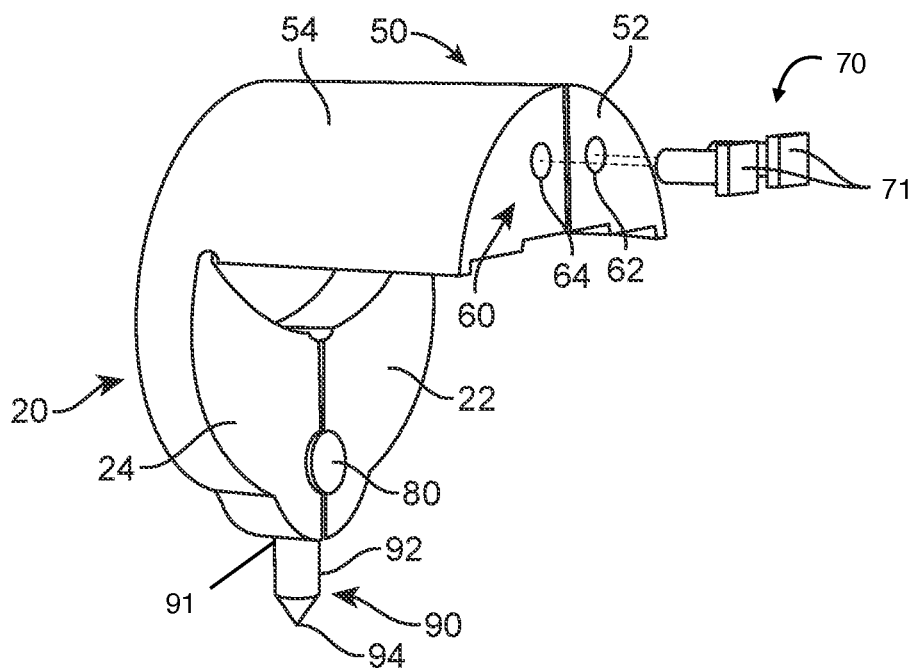
FIG. 2 shows a rear view of the present invention.
Figure 3:
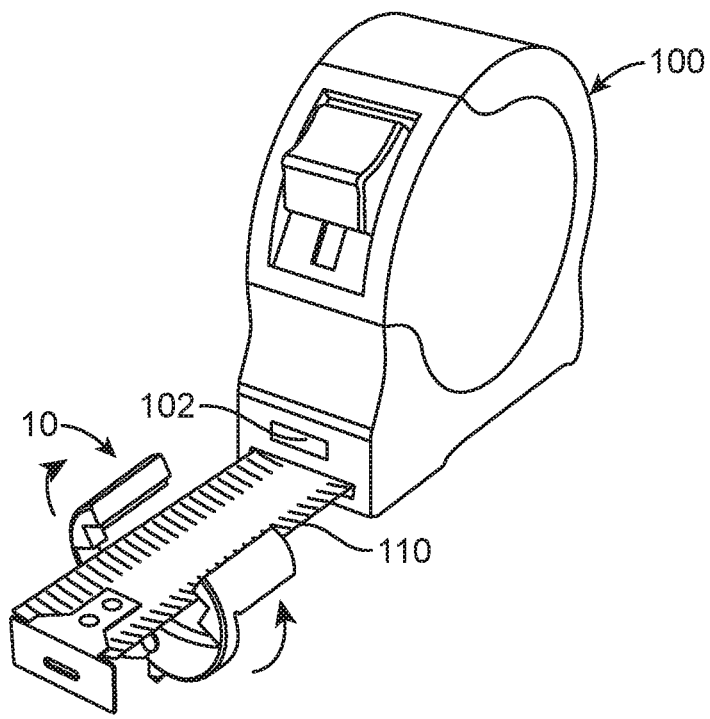
FIG. 3 illustrates how the present invention opens in order to allow it to be retrofitted onto tape measures and more specifically tape measure measuring blades of all dimensions.
Figure 4:
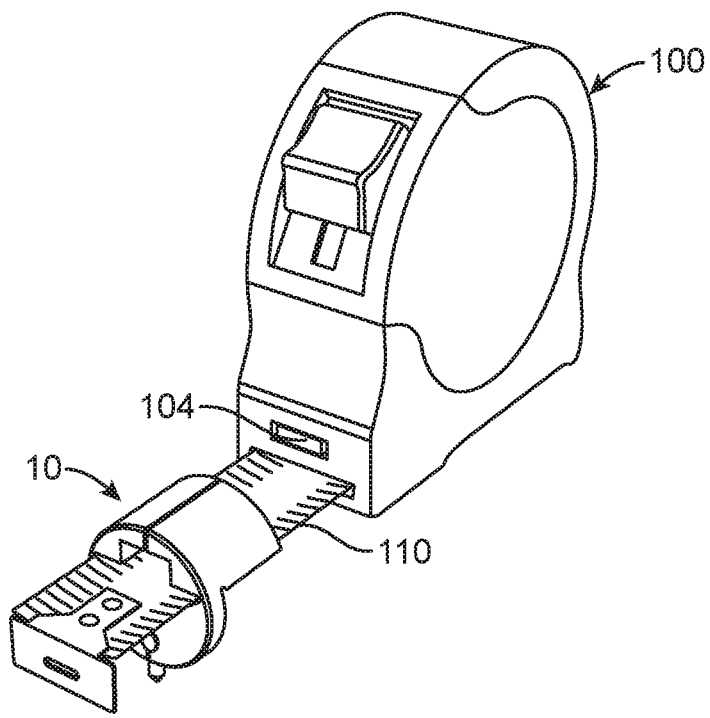
FIG. 4 is a representation of the present invention mounted onto a tape measure and more specifically the tape measure measuring blade.
Figure 5:
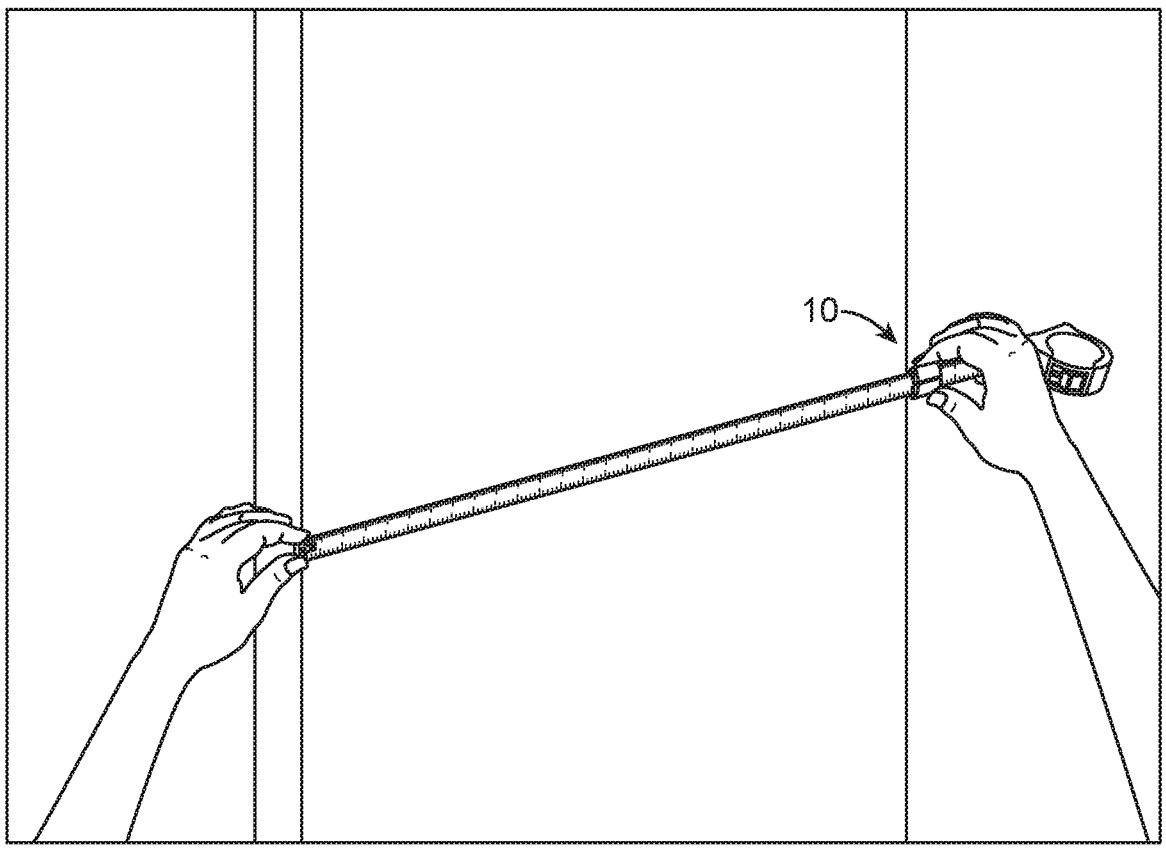
FIG. 5 shows a user making use of the present invention in an operational setting.

It can be best seen in FIG. 2 that tape measure attachment system 10 further includes overhang assembly 50 which includes overhang 51. Overhang 51 extends from the top of finger guard assembly 20 back towards the front of tape measure 102. Overhang 51 substantially makes up the length of tape measure attachment system 10. It should be known that square slot 48 extends through the entire length of overhang 51. Since tape measure attachment system 10 is possible open outwardly from a fixed point, holding member 80, it should be understood that overhang 51 comprises a left and right side. More specifically overhang 51 includes a left side overhang 52 and a right side overhang 54. Left side overhang 52 extends from attachment left side 22. Right side overhang 54 extends from attachment right side 24. Being that left side overhang 52 and right side overhang 54 are mounted to and extend from attachment left side 22 and attachment right side 24, respectively, and being that attachment left side 22 and attachment right side 24 may rotate outwardly from one another, it should be understood that it is possible for left side overhang 52 and right side overhang 54 to rotate outwardly and away from one another as well. Left side overhang 52 and right side overhang 54 only rotate outwardly and away from one another when attachment left side 22 and attachment right side 24 do, meaning that occurs simultaneously. Overhang 51 only extends partially down finger guard assembly 20 as to allow overhang 51 to be received and mounted above a blade such as measuring blade 110. Overhang 51 may preferably be semicircular in shaped, meaning rounded atop. However, it should be understood that any other shapes may be suitable for overhang 51. Since overhang 51 may be domed and being that left side overhang 52 and right side overhang 54 are a part of overhang 51, it should be understood that left side overhang 52 and right side overhang 54 may preferably be curved downwardly in the present invention. Each of left side overhang 52 and right side overhang 54 a half of overhang 51. The inner side of left side overhang 52 and right side overhang 54 may preferably be flat as to allow left side overhang 52 and right side overhang 54 to be adjacent to one another when the present invention is in a opened configuration. The closed configuration of the present invention may be when attachment left side 22 and attachment right side 24 are adjacent to one another. The closed configuration also may be when left side overhang 52 and right side overhang 54 are adjacent to one another. The opened configuration may be when attachment left side 22 and attachment right side 24 are rotated away from one another. Thereby meaning that in a opened configuration left side overhang 52 and right side overhang 54 may be rotated away from one another. For a user to avoid injury from cuts or materials from making contact with a surface, the user may use their finger to guide the present invention by placing their hands or fingers on overhang 51 when there is a need to make measurements on or across a surface such as glass, wood or metal for example. Thereby meaning the tape measurement attachment system 10 is moved laterally by a user's finger acting on overhang 51.

Overhang 51 as well as left side overhang 52 and right side overhang 54 may further include means to attach to tape measure 102. At a distal end, overhang 51 may include magnet holes 60. Magnet holes 60 may further be defined as a left side magnet hole 62 located at a distal end of left side overhang 52 and a right side magnet hole 64 located at a distal end of right side overhang 54. Left side magnet hole 62 and right side magnet hole 64 may partially extend into each of left side overhang 52 and right side overhang 54, respectively. Magnet assembly 70 includes overhang magnets 71 are then received by the aforementioned openings, more specifically, overhang magnets 71 are received and inserted into magnet holes 60. One of overhang magnets 71 may be received in each of left side magnet hole 62 and right side magnet hole 64. In an alternate embodiment, there may be more than one of overhang magnets 71, received by each of left side magnet hole 62 and right side magnet hole 64. Overhang magnets 71 are then to be attached, mounted or attracted to other magnets with opposite polarities. As such, tape measure 102 may further include a tape measure magnet hole 104 at a front end. Tape measure magnet hole 104 may preferably face the distal end of overhang 51. Tape measure magnet hole 104 may then receive a tape measure magnet 108 therein. Tape measure magnet hole 104 and tape measure magnet 108 may have shapes that corporate with one another. Any shape and size may be suitable for tape measure magnet hole 104 and tape measure magnet 108. Tape measure magnet 108 is then to attach through magnetic attraction to overhang magnets 71. While tape measure attachment system 10 is mounted to measuring blade 110 of tape measure 102 and in a non-operational setting, overhang magnets 71 may mount to tape measure magnet 108 as to secure the present invention onto tape measure 102 when in storage.

The present invention may further include pivot assembly 90 including a pivot point 91. Pivot point 91 may preferably be mounted below holding member 80. Pivot point 91 may be partially inserted into finger guard assembly 20 to be secured in place. Pivot point 91 may have a body 92 that is substantially cylindrical. Body 92 may have a head 94 that tapers as a pointed and sharp end of head 94 at a distalmost end is reached. Head 94 may be used to create a fixed point that is momentarily secured into a working surface as a user takes measurements with tape measure 102. The user may choose to create circular measurements such as creating a circumference, should their work require it, by using head 94 of pivot point 91 to create a fixed point and then rotating tape measure 102 about pivot point 91. Preferably pivot point 91 may be made of metal, but plastic, wood or any other materials may be suitable.

It should be understood that in an alternate embodiment the present invention is one whole piece. Thereby meaning that finger guard assembly 20 and overhang assembly 50 may simply be made of one whole component. In an alternate embodiment ginger guard assembly 20 may be whole instead of comprising attachment left side 22 and attachment right side 24. In an alternate embodiment overhang 51 may be whole instead of comprising left side overhang 52 and right side overhang 54.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tape measure attachment system, comprising:
   a. a tape measure assembly including a tape measure having a measuring blade thereon, said tape measure further including a magnet hole at a front side of said tape measure above of said measuring blade;
   b. a finger guard assembly having an attachment left side and an attachment right side being adjacent to each other;
   c. an assembly including an overhang extending from said finger guard assembly, said overhang further including an overhang left side and an overhang right side being adjacent to each other, said overhang left side more specifically extending from said attachment left side and said overhang right side extending from said attachment right side;
   d. a holding member adapted to attach said attachment left side along with said overhang left side extending therefrom to said attachment right side along with said overhang right side extending therefrom, said holding member allows said attachment left side and attachment right side to swivel and rotate outwardly away from each another;
   e. a central slit assembly having a blade central slit, said blade central slit further defined by an attachment left side opening and an attachment right side opening coming together, said blade central slit being semicircular on a bottom side and partially straight edged on a top side, said blade central slit to receive said tape measure blade therethrough; and
   f. a pivot assembly having a pivot point extending downwardly underneath said holding member therefrom.

2. The system of claim 1, wherein said overhang includes magnet holes, said magnet holes further defined as a left side magnet hole located on a distal end of said attachment left side and as a right side magnet hole located on a distal end of said attachment right side.

3. The system of claim 2, wherein said magnet holes receive overhang magnets therein, more specifically, said left side magnet hole and right side magnet hole each receive one of said overhang magnets therein.

4. The system of claim 1, wherein said tape measure magnet hole receives a tape measure magnet therein that is magnetically attracted to said overhang magnets mounted in said magnet holes.

5. The system of claim 1, wherein a square slot is mounted above said measuring blade slot.

6. The system of claim 1, wherein said pivot point has a pointed and sharp distal end.

7. The system of claim 6, wherein said pivot point includes a body and a head, said head tapers as pointed and sharp distalmost end is reached.

8. The system of claim 1, wherein said tape measure attachment system is made of plastic, metal, wood or combinations thereof.

9. The system of claim 1, wherein said central slit assembly is able to be retrofitted onto various tape measure blades of various shapes or sizes.

10. The system of claim 1, wherein said pivot point is adapted to create a fixed point.

* * * * *